United States Statutory Invention Registration [19]

West

[11] Reg. Number: H709

[43] Published: Nov. 7, 1989

[54] HEATER SYSTEM FOR CURING ROCKET MOTOR MATERIALS

[75] Inventor: Leonard R. West, Salt Lake City, Utah

[73] Assignee: The United States of America as represented by the Secretary of the Navy, Washington, D.C.

[21] Appl. No.: 111,845

[22] Filed: Oct. 19, 1987

[51] Int. Cl.[4] ..... H05B 3/40

[52] U.S. Cl. ..... 219/523; 219/389

[58] Field of Search ..... 219/469, 470, 471, 389, 219/523

[56] References Cited

U.S. PATENT DOCUMENTS

| | | | |
|---|---|---|---|
| 2,939,383 | 6/1960 | Kanaga | 219/389 |
| 3,148,272 | 9/1964 | Aitken | 219/523 |
| 3,546,430 | 12/1970 | Kane | 219/523 |
| 4,304,986 | 12/1981 | Olson | 219/523 |

*Primary Examiner*—Thomas H. Tarcza
*Assistant Examiner*—Linda J. Wallace
*Attorney, Agent, or Firm*—C. D. B. Curry; W. C. Daubenspeck; K. S. Moss

[57] ABSTRACT

A heating system for curing rocket motors includes a plurality of separate electrical resistance heating elements such as heating rods or cal-rod heaters. The system is floor mounted and has a cantilever supported heating section that is temporarily positioned and sealed within the interior of a rocket motor. The rocket motor is then slowly rotated wherein relative rotation between the rotating rocket motor and the stationary heating section is provided. A plurality of uniquely positioned heating elements are selectively activated at predetermined power levels to tailor proper heating of all interior surfaces of the rocket motor.

10 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEATER SYSTEM FOR CURING ROCKET MOTOR MATERIALS

BACKGROUND OF THE INVENTION

1. Field of the Invention

The present invention relates to a heating system for curing rocket motor materials and more particularly, but without limitation thereto, to an electrical resistance heating system for curing solid propellant rocket motor insulation.

2. Description of the Prior Art

Several heating systems have been developed for curing rocket motor materials during the manufacturing process. These have traditionally used large ovens into which the rocket motor is placed. Heat to these ovens has been provided by any of several well known energy sources. The disadvantages of these prior systems include slowness in bringing the large oven up to proper temperature, high energy consumption, requirement of large facilities and the heating of all motor components including those which are not desired. These and other disadvantages have been overcome by the electrical resistance heating system of the present invention.

SUMMARY OF THE INVENTION

An object of the present invention is to provide a heater system for curing rocket motor materials such as interior insulation.

A further object of the present invention is to provide an electrical resistance heating rod system that has low energy consumption, requires small facilities, rapidly rises to operating temperature, and primarily heats only the motor component that is desired to be heated.

These and other objects have been demonstrated by the present invention wherein a plurality of separate electrical resistance heating elements such as heating rods, cal-rod heaters, coils or the like, are supported, configured and activated to provide an effective heating system. The stationary heating system is floor mounted and has a cantilever supported heating section that is temporarily positioned and sealed within the interior of a rocket motor. The rocket motor is then slowly rotated wherein relative rotation between the rotating rocket motor and the stationary heating section is allowed by the seal. A plurality of uniquely positioned heating elements are selectively activated at predetermined power levels to tailor proper heating of all interior surfaces of the rocket motor which may have a highly configured interior insulator that is being cured. After achieving proper temperature and cure time the rotation is terminated and the heating section is removed.

DESCRIPTION OF THE PREFERRED EMBODIMENT

Figure 1:
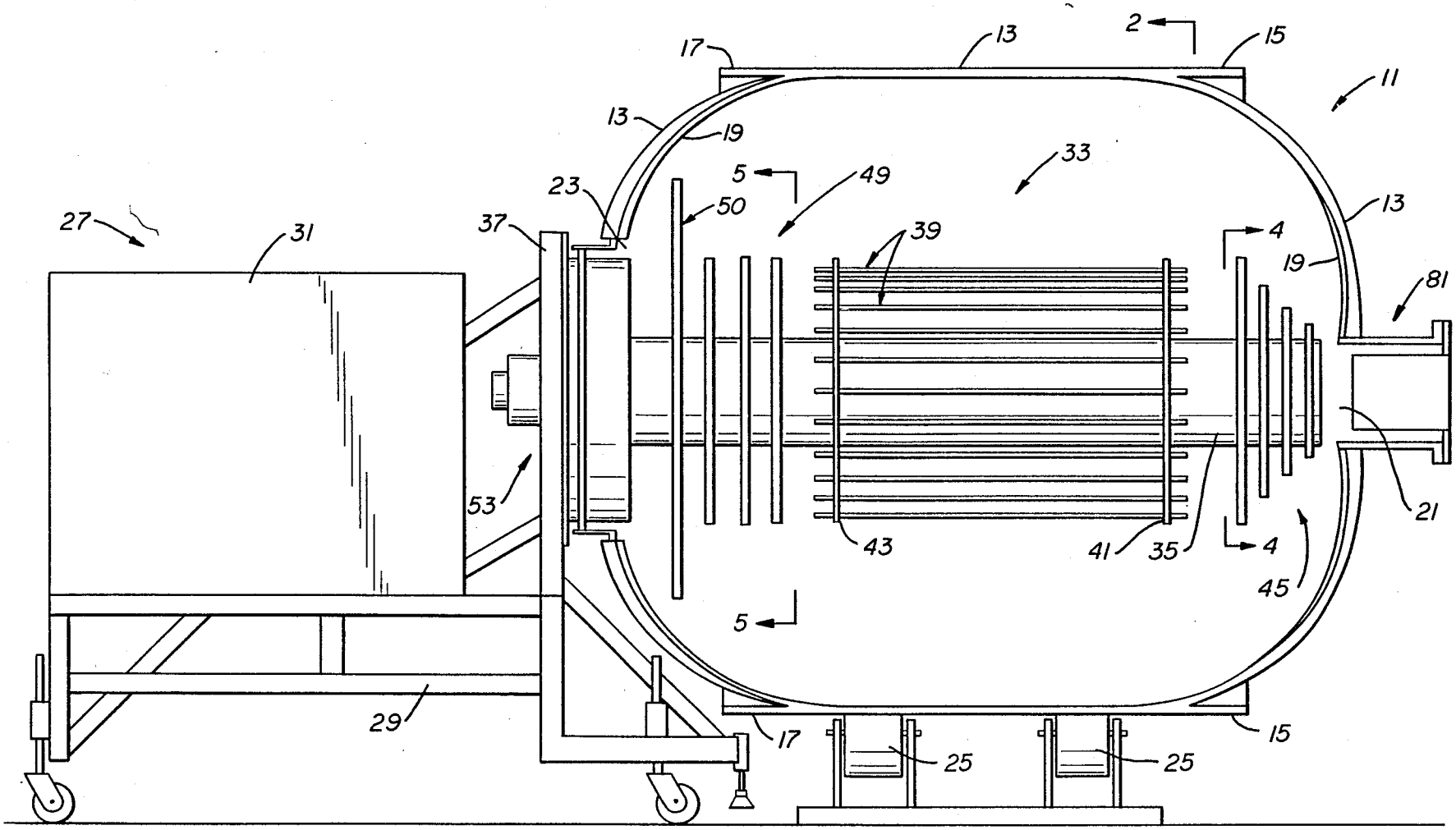
FIG. 1 is a diagramatic side elevation view in section of the overall rocket motor and rocket motor heating system of the present invention.
Figure 2:
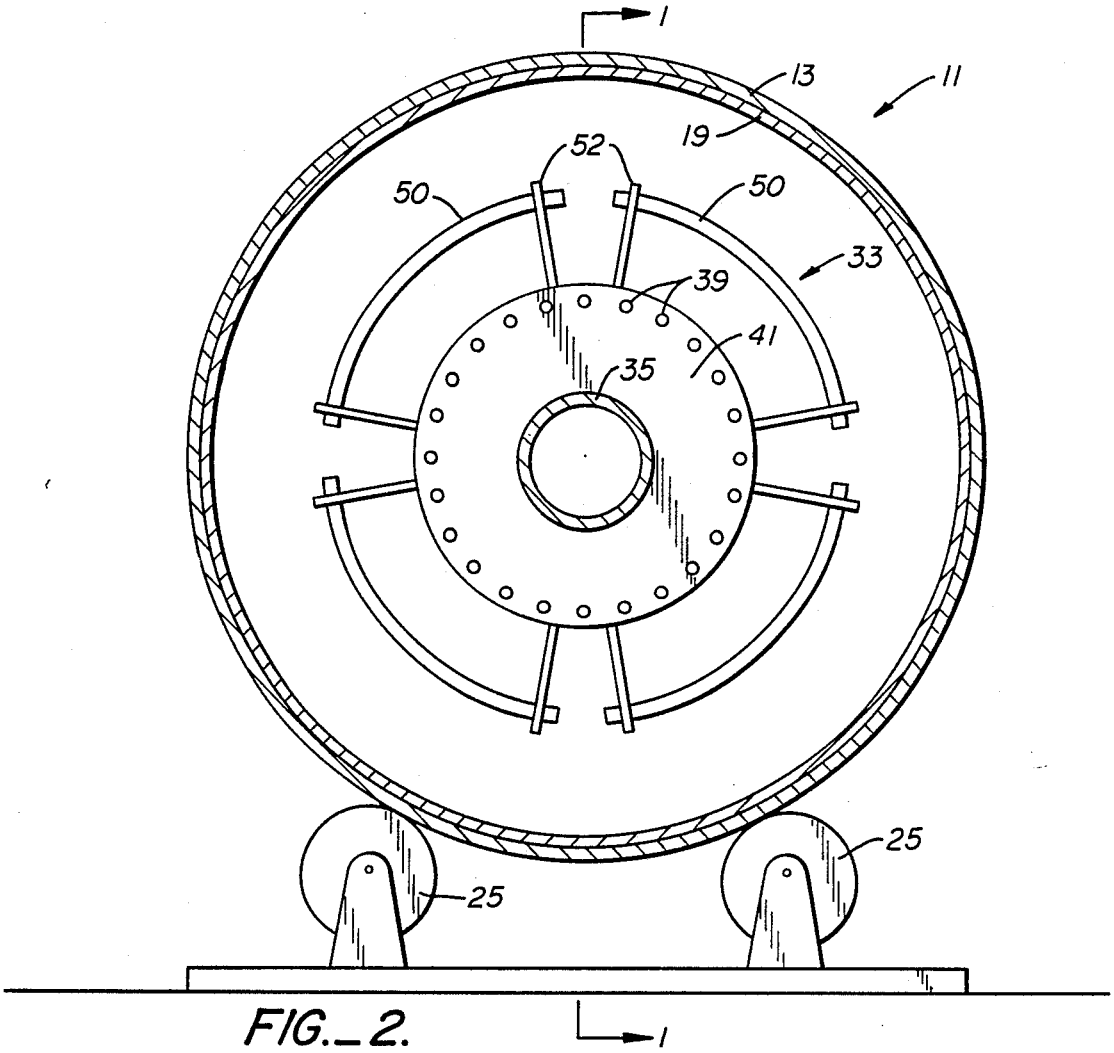
FIG. 2 is a diagramatic end view in section of the rocket motor and heating system taken at section 2—2 of FIG. 1.

In FIGS. 1 and 2 is shown the overall electrical heating system for heating or curing rocket motor materials located on the interior of the rocket motor. In certain solid propellant rocket motor manufacturing processes one of the major steps is obtaining a proper chemical casebond between the insulator and the propellant. This is achieved, for example, by using an appropriate solvent, such as a polyol/diazidoformate mixture, that is applied to the insulator surface. After the solvent has evaporated, leaving a thin-film of polyol/diazidoformate on the insulator surface, the insulator surface is then heated to affect grafting, after which casting of the motor results in chemical bonding between the insulator and propellant.

In accordance with the present invention this is achieved by using a plurality of separate electrical resistance heaters, such as coils, heating-rods, so called cal-rod heaters and the like. The preferred embodiment uses cal-rod heaters but other equivalent radiant heaters are also satisfactory. The radiant heating rod system has been found to have the following advantages: They emit radiant energy that is transmitted through space without significant loss and this energy is absorbed by the rocket motor insulator, for example, at which time it converts to heat. Since the motor in effect forms a closed chamber, any radiant energy not absorbed by the insulator is reflected to some other part of the insulator surface where it can be absorbed. It has been found tat radiant energy can easily penetrate boundary layers, thereby making it possible to heat a thin layer of the insulator for only a short period of time. In addition, it has been found that the energy output of the cal-rod heaters, for example, is easily controlled by power input, thus by varying the number of rods, shape and power input the energy distribution throughout the chamber can be tailored to what is needed. It has also been found that radiant energy enhances the chemical cure reaction, reducing the time and heat required for cure completion. The present system can better accomplish in a one hour period what an oven can accomplish in a 4 to 12 hour period and system operation and overall hardware costs are much less.

Figure 3:
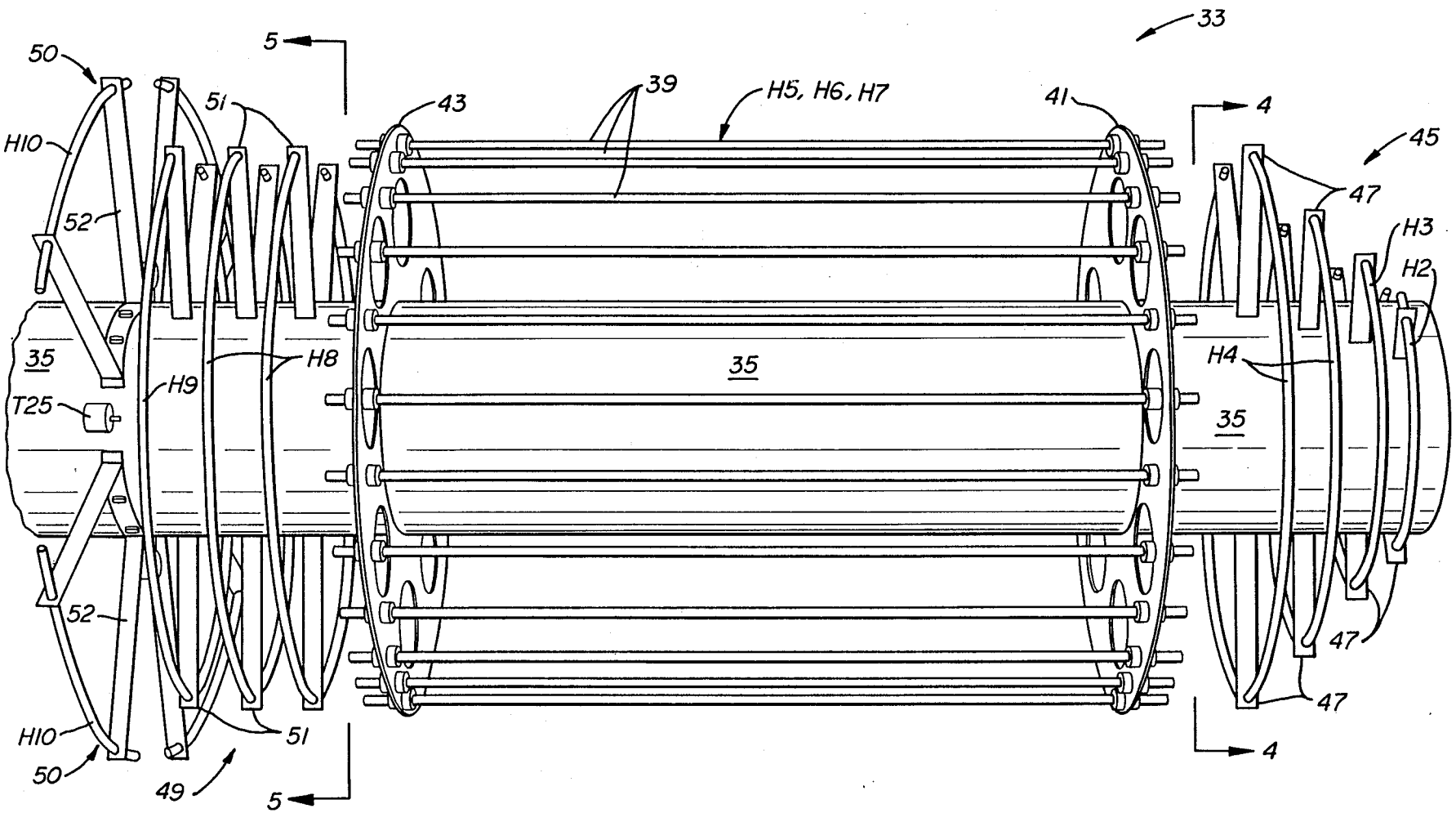
FIG. 3 is a pictorial view of one embodiment of the radiant rod heater system of the present invention.

In FIGS. 1, 2 and 3 are shown rocket motor 11 including chamber 13, skirts 15 and 17, insulator 19, forward opening 21, rear opening 23 and heating system 27. The exterior of the rocket motor is mounted in the horizontal position on four rollers 25, one of which is powered, to support, align and rotate the motor at about one revolution per minute, for example. Rotation of the motor is required to nullify the effect of hot air rising and being trapped in the top of a stationary motor chamber during the heating cycle and thereby causing undesirable non-uniform liner temperatures. The heating system 27 includes, support cart 29 electrical power and control device 31 and radiant rod heater system 33.

The radiant rod heater system 33 includes a plurality of radiant heating rods that are mounted on support tube 35 which is rigidly cantilevered in the horizontal position by vertical support member 37 of support cart 29. As best shown in FIG. 3 a plurality of horizontal heating rods 39 are supported between circular front plate 41 and circular rear plate 43. The forward heating rods 45 are rigidly supported by radial support members 47. The rear heating rods 49 are rigidly supported by radial support members 51. Radially segmented heating rods 50 are supported by removably attached support members 52. In this embodiment, support members 52 are removably bolted to the support tube 35. This feature allows $H_{10}$ to be bolted in place after the heater system has been positioned inside the chamber. The conducting wires for supplying power to the various heating rods are passed through the interior of the support tube 35 to electrical power and control device 31.

Figure 5:
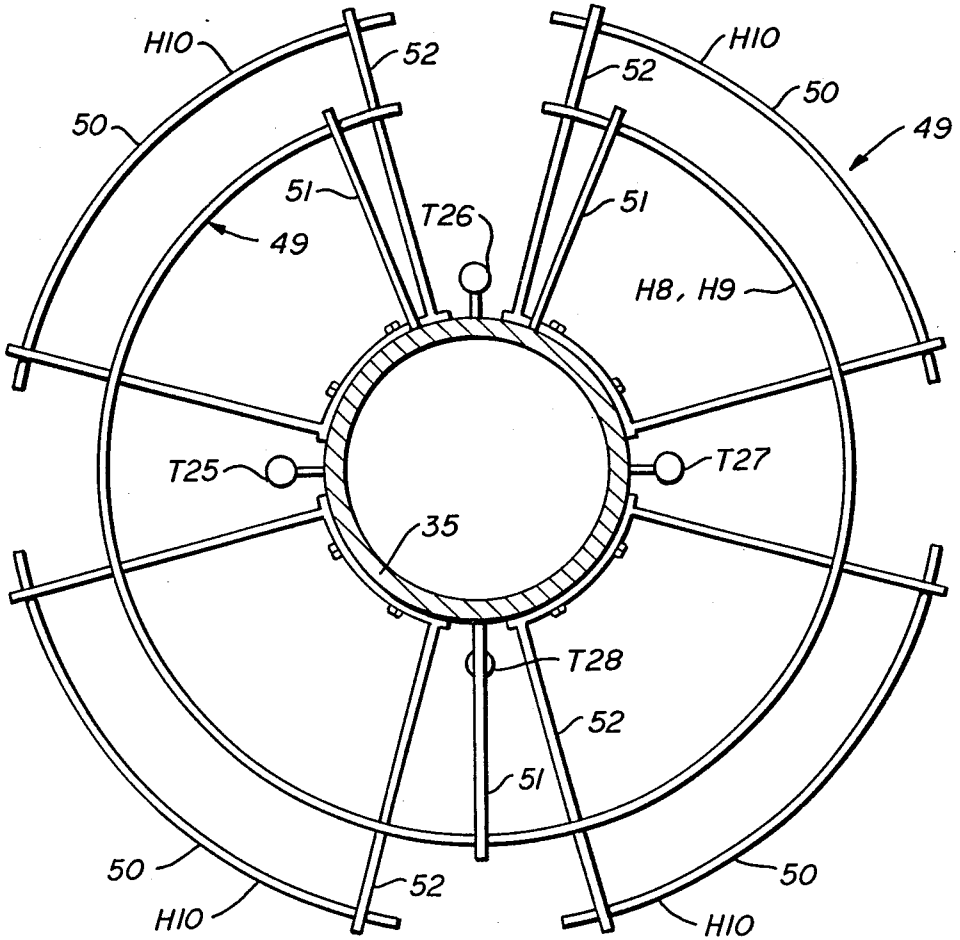
FIG. 5 is an end view of the rear heating rods of heating system taken at section 5—5 of FIGS. 1 and 3.
Figure 4:
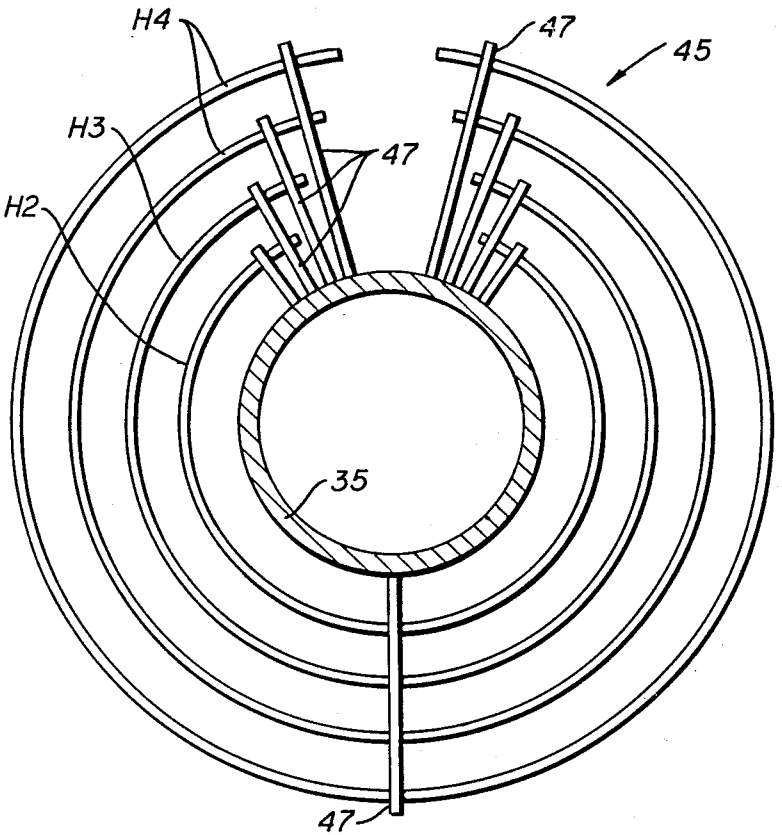
FIG. 4 is an end view of the front heating rods of the heating system taken at section 4—4 of FIGS. 1 and 3.

In FIG. 4 is shown the arrangement and circular configuration of front heating rods 45 which are denoted as $H_2$, $H_3$ and $H_4$ as will be hereinafter explained. In FIG. 5 is shown the arrangement and circular configuration of rear heating rods 49 which are denoted as $H_8$, $H_9$, and $H_{10}$, as will be hereinafter explained. In addition, in FIGS. 5 and 6 are shown heat sinks $T_{25}$ through $T_{28}$ that are mounted on support tube 35 as illustrated.

Figure 6A:
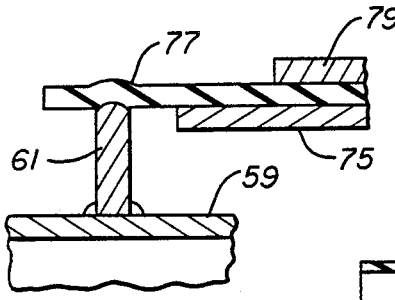
FIG. 6A is an enlarged sectional view taken at 6A—6A of FIG. 6.
Figure 6:
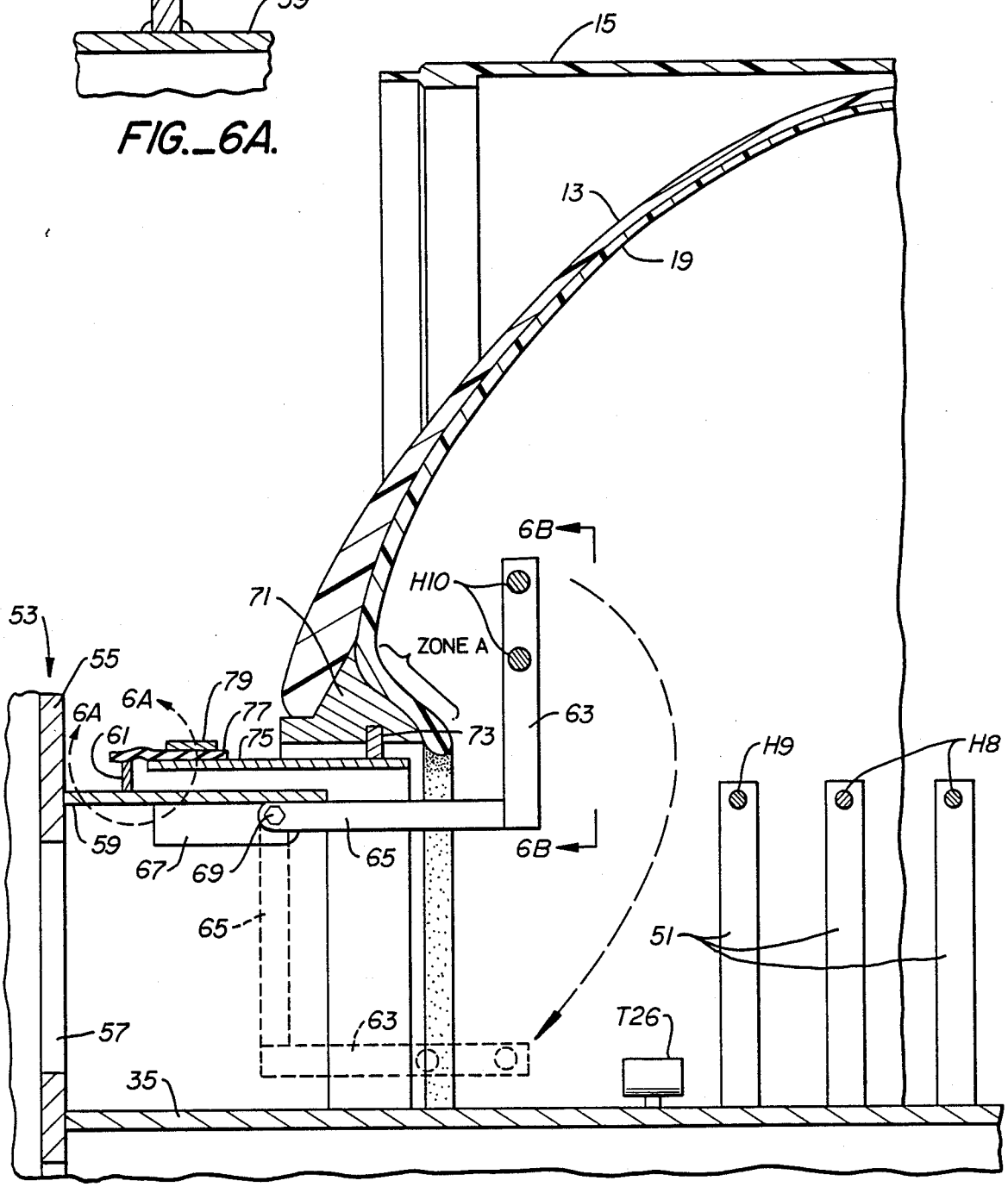
FIG. 6 is an enlarged cross sectional view of the rear section of the rocket motor and heating system of FIG. 1.
Figure 6B:
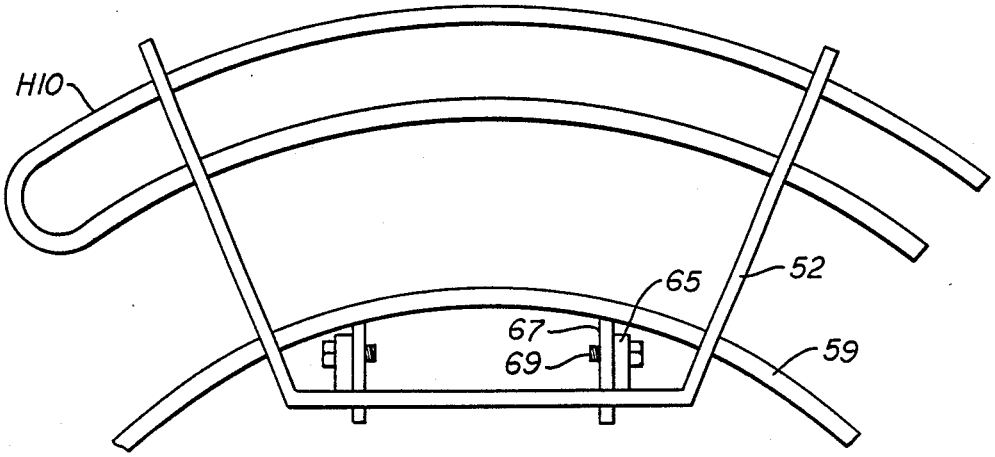
FIG. 6B is a sectional view taken at 6B—6B of FIG. 6.

In FIGS. 6, 6A and 6B are shown enlarged views of the rear section and include heating rods $H_8$ and $H_9$ that are support by radial support members 51. The rear section includes rear closure 53 including circular plate 55 that is rigidly attached to support tube 35, window 57, horizontal tube 59, and seal ring 61. In this embodiment each of the four heating rods $H_{10}$ is support by members 63, 65 and 67 and is rotatably mounted at pivot 69 as illustrated. Member 67 is rigidly connected to horizontal tube 59 Between chamber 13 and insulator 19 is circular fitting 71 and attached thereto is snap ring 73 which is mounted on protection ring 75. As best shown in FIG. 6A rubber seal 77 is supported by protection ring 75 and is held in place by band 79. This seal allows the rocket motor to rotate while the heater assembly remains stationary.

Figure 7:
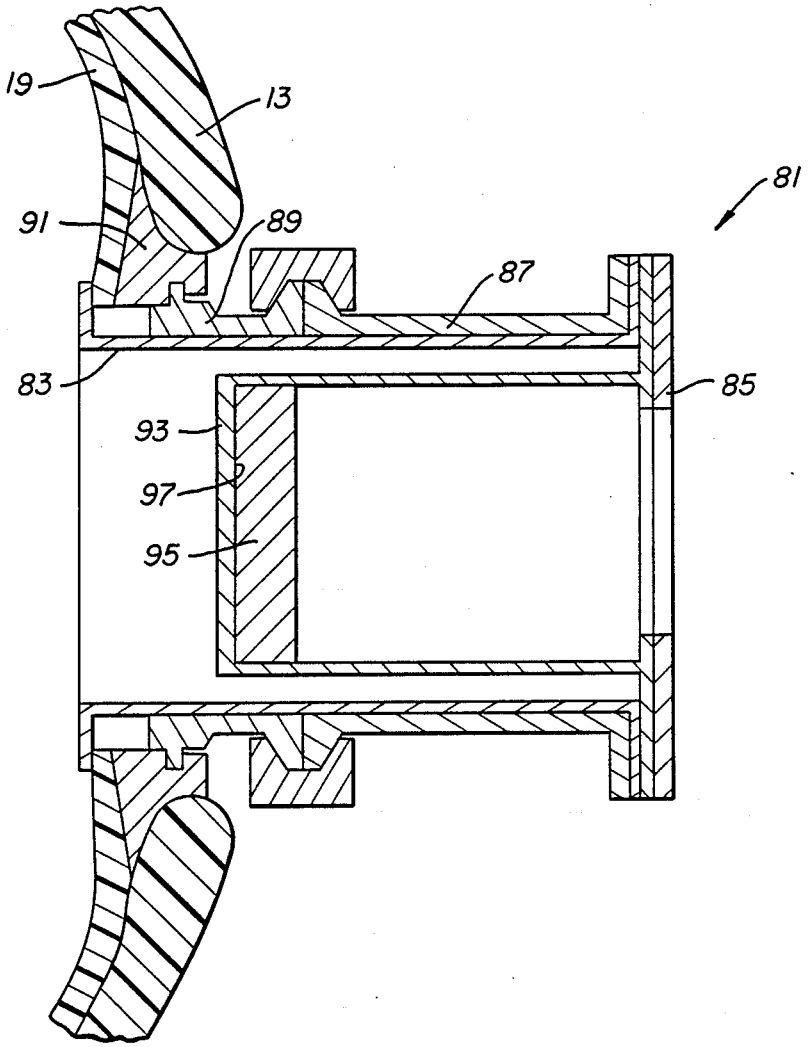
FIG. 7 is an enlarged cross sectional view of the front section of the rocket motor and heating system of FIG. 1.

In FIG. 7 is shown an enlarged view of the front section and includes front closure 81 including casting neck 83, end plate 85, casting neck adapter 87 and flange ring 89 that is supported by circular fitting 91. Hat section 93 is mounted on end plate 85 and includes heat sink 95 and embedded thermocouple 97 which function as hereinafter explained.

The heater rods which make up the heater system are designed such that the distribution of energy input to the chamber can be widely varied. This is accomplished by independent breaker systems that can be wired to selected heater rods. The present embodiment has ten independent breakers, not shown, located in electrical and power control device 31 of FIG. 1.

OPERATION

The following is a description of the preferred design criteria and operation. The heater system should have excess power available such that the actual power requirements can be met by not using some of the breakers and therefore some additional heater rods can be added if necessary. Since the energy required to heat the structure is a function of the mass and the mass will act as a heat sink, it is necessary to apply more energy near the loading rings of the domes in the illustrated embodiment. It will also take considerably longer to heat the high mass regions and the heat should be applied slowly in order to aid in the required uniform heating of the surface. The heater rods used to heat the dome areas should be circular in shape and have a distribution similar to that shown in FIG. 4. Two or three heaters should be located within about 6 inches of the high mass regions. It is important that the entire insulator surface be exposed to direct radiant energy emitted from the heater rods. In regions such as the area of reverse curvature, see Zone A of FIG. 6, this is accomplished by designing the heater rod support brackets such that they can be retracted during insertion into the chamber and then extended into position as shown in FIGS. 3 and 5. This is accomplished by use of removable bolts on radial support members 52. As far as practical, the energy emitted by the heater rods should strike the surface to be heated at angles greater than 60 degrees. In this embodiment, because it is relatively thin, the center section of the chamber requires the minimum energy per unit area. Energy required per unit area will increase in the dome regions in accordance with case thickness and near the loading rings the energy requires per unit area will be more than double that of the center section.

Figure 8:
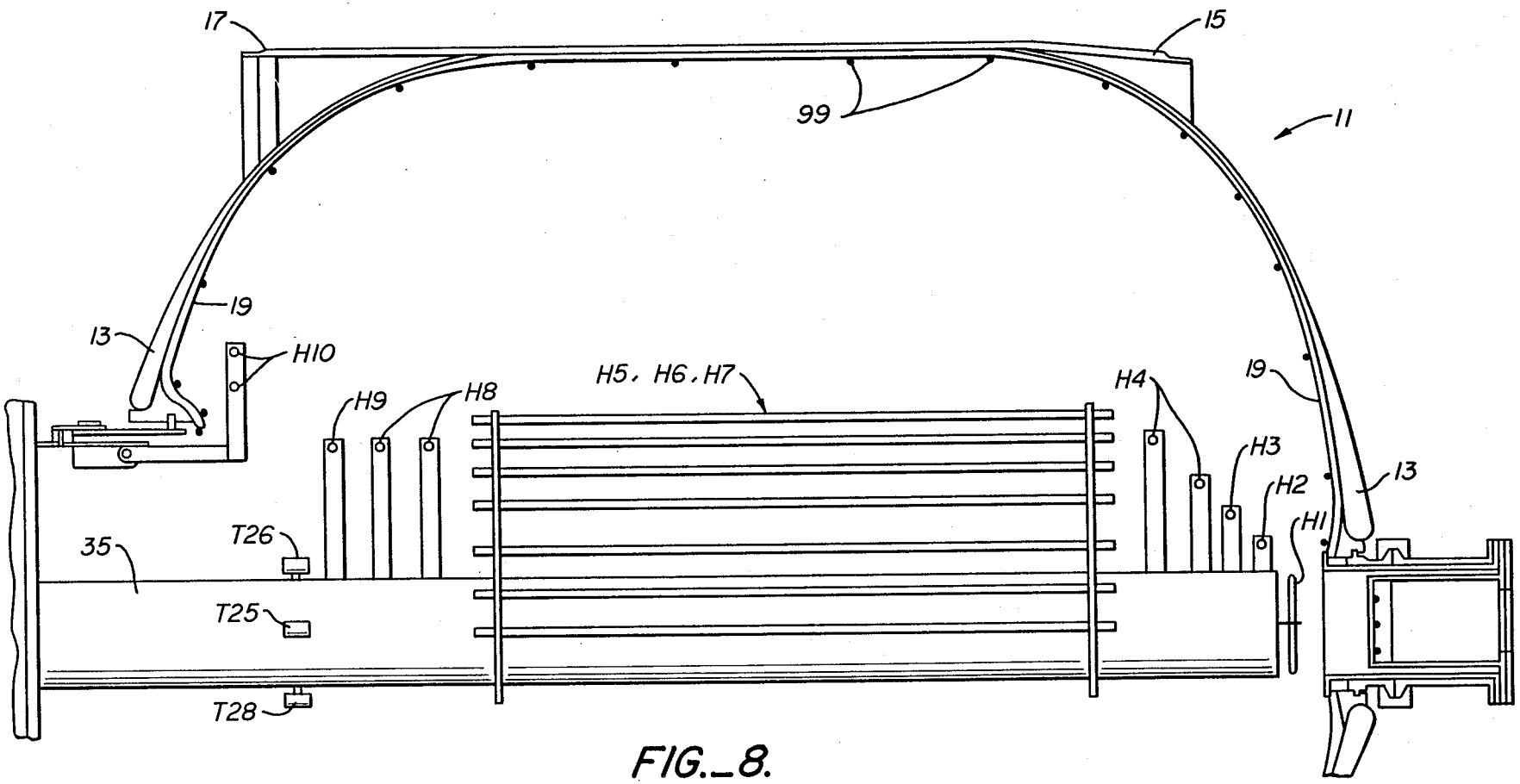
FIG. 8 is an illustration of the rocket motor and heating system in section showing the thermocouple and heater arrangement used to calibrate the system.

The heater rod system requires the establishment of a data base for each chamber design. The data base provides the information necessary to predict the insulator surface temperature by knowing how the chamber will respond to a specified heating cycle. In order to assure proper thermoresponse, a set of control points at which the temperature can be measured are selected. Establishment of the data base is accomplished by instrumenting a chamber of particular design configuration with thermocouples 99, as illustrated in FIG. 8. The thermocouples are closely spaced along a segment of the entire insulator surface. Care should be taken to assure that thermocouples are located in the most critical regions. The thermocouples are preferrably placed on the insulator surface and covered with a thin piece of insulator material. Thermocouple cover pads are bonded to the insulator to provide good heat transfer from the cover pad to the insulator. This arrangement assures that the temperatures indicated by the thermocouples are good measures of the actual insulator surface temperature. With the chamber thus insulated, a good profile of the thermoresponse of the insulator surface can be obtained for any heat load.

Through a trial and error process, an acceptable heating procedure is developed. In general, the procedure should involve preheating the areas of high mass first. As various regions get up to the required temperature the heaters assigned to the segment are turned off.

All heating cycles preferrably start with the chamber at ambient temperature. After each cycle the response of all thermocouples are studied to provide direction of changing the heater rod setup and heating program. Test samples of insulator material that have been properly coated and bonded to the insulator surface next to the thermocouples are tested to assure that the heat load results in proper cure of the insulator surface.

In a production situation direct measurement of the surface temperature during the cure cycle is not practical. It therefore becomes necessary to estimate the surface temperature of the insulator by measuring temperature response at points other than the actual points of interest. In regions where there is sufficient heat transfer throughout the chamber, a good estimate of surface temperature of the insulator can be made by optically measuring the outside surface temperature of the case. These optical measurements of surface temperature can be made with an Omega scope for example. In regions of high mass the thermoresponse of the structure is too slow to determine surface temperature on the insulator surface by measuring the outside surface temperature. The hat section 93 shown in FIG. 7 was designed such as to provide the heat sink needed to control the curing of the insulator in the region of the casting neck.

Several different heating cycles and combination of wiring heaters give 100% cure of all sample locations throughout the chamber (see FIG. 8 reference numeral 99 for location of samples).

As shown in FIG. 7, the chamber is cured with the casting neck adapter 87 and casting neck 83 installed. The hat section 93 seals off the forward dome and has a built-in heat sink 95 into which three thermocouples 97, for example, are embedded. Using three thermocouples to obtain the same temperature measurement provide assurance that the temperature of the heat sink is a reliable measurement. The heat sink in the hat section is sized such that its thermoresponse is an indicator of how the insulator surface in the region of the forward loading ring responds to a given heat load. In a similar manner, the heat sinks built into the support structure at 90° intervals (see $T_{25}$, $T_{26}$, $T_{27}$ and $T_{28}$ in FIGS. 5, 6 and 8) provides a good indicator of the thermoresponse of the rear dome insulator.

Sealing of the rear dome is accomplished with a cylindrical sheet of rubber 77 extending from the protection ring 75 and resting on the seal ring 61, as best shown FIG. 6A. The protection ring and rubber seal rotate with the rocket motor chamber. The seal ring remains fixed and the rubber seal slips on the seal ring as the chamber rotates.

From a heat transfer point of view tests without the seal indicated that the seal was not necessary to get proper heating of the chamber. However, the residual solvent on the insulator surface is vaporized during heating and may be flammable. These vapors should be vented outside the room by a conduit not shown.

During the heating cycle the chamber is preferrably purged with nitrogen gas to assure that an inflammable gas mixture is not formed inside the chamber during cure cycle.

The instrumentation and heater rod arrangements are shown in FIG. 8. $H_1$, $H_2$, $H_3$, $H_4$, $H_8$ and $H_9$ were circular heaters of the configuration illustrated in FIG. 4. Heater $H_1$ is only diagramatically shown in FIG. 8 and may or may not be necessary depending upon the particular chamber thermal responses. Heaters $H_5$, $H_6$ and $H_7$ are mounted parallel to the centerline axis of the chamber. Heater $H_{10}$ consists of 4 separate heaters, as shown in FIG. 5. A preferred mounting method is shown in FIGS. 3 and 5 wherein each heater support is removable by removing mounting bolts, allowing assemblage after the heating system has been positioned on the chamber. In an alternate mounting method each of the four heaters making up $H_{10}$ are mounted on a bracket as shown in FIGS. 6 and 6B that can be rotated towards the center of the heater during assembly of the heater system.

Figure 9:
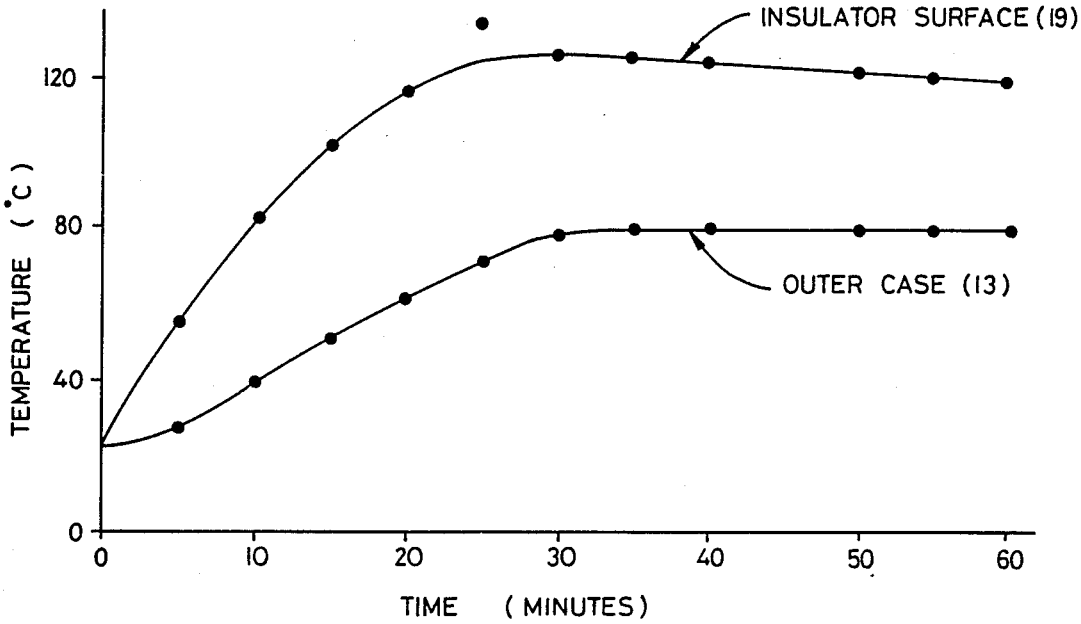
FIG. 9 includes curves showing the rocket motor outer case and insulator surface temperatures as a function of time.

The insulator surface is properly heated by using a specified heating program and control of the heating cycle is accomplished by observing the thermoresponse of several control points. In production the heater rod arrangement described is used to heat the insulator surface. Heaters $H_1$ and $H_{10}$ are used to start the heating cycle by pre-heating the high mass region of the chambers. After preheating the loading ring regions for 20 minutes, with $H_1$ and $H_{10}$, Heaters $H_3$, $H_5$, $H_6$, $H_8$ and $H_9$ are started. Ten minutes later, 30 minutes from the start of the heating cycle, $H_4$ is turned on. During the entire heating cycle the thermoresponse of the control points are continually monitored. As the various control points reach the upper control temperatures the heaters are turned off. In FIG. 9 are shown typical curves of the outer case and insulation surface temperature as a function of time.

This invention has been described in detail with particular reference to certain preferred embodiments thereof, but it will be understood that variations and modifications can be effected within the spirit and scope of the invention.

I claim:

1. A heater system for radiant heating of an interior of a rocker motor comprising:

(a) a power and control device;

(b) a heating element system positioned within the interior of said rocket motor;

(c) said heating element system having a plurality of separate heating elements;

(d) said power and control device is operatively connected to said plurality of separate heating elements to selectively activate said heating elements at predetermined power levels to tailor uniform heating of all interior surfaces of the rocket motor.

2. The heater system of claim 1 wherein:

(a) said rocket motor is rotated while said heating elements are activated.

3. The heater system of claim 2 wherein:

(a) said heating elements are supported by an elongated cantilever supported tube that is horizontally positioned within said rocket motor.

4. The heater system of claim 3 wherein:

(a) said tube is sealed at a rear end of said rocket motor by a rear closure.

5. The heater system of claim 4 wherein:

(a) a front end of the rocket motor is sealed by a front closure.

6. The heater system of claim 5 wherein:

(a) said heating element system includes a front group of heating elements, a rear group of heating rods and a center group of heating rods.

7. The heater system of claim 6 wherein:

(a) said center group of heating rods comprise a plurality of linear horizontal heating rods that are spaced apart and are supported by and encircle said tube.

8. The heater system of claim 7 wherein:

(a) said front group of heating rods comprise a plurality of circular heating rods that are spaced apart and are supported by and encircle said tube.

9. The heater system of claim 8 wherein:

(a) said circular heating rods progressively decrease in diameter.

10. The heater system of claim 7 wherein:

(a) said rear group of heating rods comprise a plurality of circular heating rods that are spaced apart and supported by and encircle said tube.

* * * * *